(12) United States Patent
Mehta et al.

(10) Patent No.: US 7,017,547 B2
(45) Date of Patent: Mar. 28, 2006

(54) METHOD AND APPARATUS FOR CONTROLLING LIQUID-PHASE FUEL PENETRATION DISTANCE IN A DIRECT-FUEL INJECTED ENGINE

(76) Inventors: Darius Mehta, 9235 Ridge Breeze, San Antonio, TX (US) 78250; Lee G. Dodge, 7315 Whithers La., San Antonio, TX (US) 78240; Rudolf H. Stanglmaier, 1916 Winterberry Way, Fort Collins, CO (US) 80526; Charles E. Roberts, Jr., 8511 Timber West, San Antonio, TX (US) 78250

( * ) Notice: Subject to any disclaimer, the term of this patent is extended or adjusted under 35 U.S.C. 154(b) by 144 days.

(21) Appl. No.: 10/760,645

(22) Filed: Jan. 20, 2004

(65) Prior Publication Data

US 2004/0255900 A1    Dec. 23, 2004

Related U.S. Application Data

(60) Provisional application No. 60/477,015, filed on Jun. 9, 2003.

(51) Int. Cl.
*F02M 53/02*    (2006.01)

(52) U.S. Cl. ...................... 123/305; 123/557

(58) Field of Classification Search ............... 123/543, 123/549, 552, 557, 305
See application file for complete search history.

(56) References Cited

U.S. PATENT DOCUMENTS

| | | | |
|---|---|---|---|
| 5,626,115 A | | 5/1997 | Kawaguchi |
| 5,758,826 A | * | 6/1998 | Nines ......................... 123/549 |
| 6,006,720 A | | 12/1999 | Yanagihara et al. |
| 6,125,818 A | | 10/2000 | Okamoto et al. |
| 6,161,525 A | | 12/2000 | Ficht |
| 6,616,066 B1 | * | 9/2003 | Guettler et al. ............. 123/549 |
| 6,732,721 B1 | * | 5/2004 | Guettler et al. ............. 123/557 |
| 6,920,861 B1 | * | 7/2005 | Hayakawa et al. ......... 123/295 |

* cited by examiner

*Primary Examiner*—Erick Solis
(74) *Attorney, Agent, or Firm*—Gunn & Lee, P.C.; Ted D. Lee

(57) ABSTRACT

Fuel temperature management is used to control the penetration distance of liquid-phase fuel into the combustion chamber of direct injection engines. Fuel temperature management enables the alteration of liquid-phase penetration distance to compensate for real-time changes in fuel composition, injector geometry, injection pressure, combustion mode, or combustion chamber thermodynamic conditions during engine operation. Alteration of the liquid-phase penetration distance prevents or reduces undesirable liquid fuel impingement on combustion chamber surfaces.

6 Claims, 3 Drawing Sheets

METHOD AND APPARATUS FOR CONTROLLING LIQUID-PHASE FUEL PENETRATION DISTANCE IN A DIRECT-FUEL INJECTED ENGINE

This application is based upon provisional patent application Ser. No. 60/477,015, filed on Jun. 9, 2003, to which priority is claimed.

BACKGROUND OF THE INVENTION

1. Technical Field

This invention relates generally to a method and apparatus for controlling the length of liquid-phase fuel penetration into the combustion chamber of a direct-fuel injected engine, and more particularly to such a method and apparatus in which liquid fuel is controllably heated prior to injection into the engine combustion chamber to alter the liquid-phase penetration distance of the fuel.

2. Background Art

The performance of both spark ignition and compression ignition engines, and variations thereof, is generally improved by the use of controlled fuel injection into the combustion chamber, or more commonly into multiple combustion chambers, of the engine. Controlled fuel injection enables precise regulation of fuel flow quantity and injection timing, thereby providing better control of the combustion event for optimum efficiency and emissions reduction.

Several approaches have been proposed for controlling the combustibility of injected liquid fuels. For example, U.S. Pat. No. 6,125,818 granted Oct. 3, 2000 to Yoshio Okamoto, et al. for FUEL INJECTOR AND INTERNAL COMBUSTION ENGINE HAVING THE SAME, describes a direct injection spark ignition engine fuel injector directed to improving the combustibility and ignitability of the injected fuel. The proposed fuel injector uses multiple fuel swirl methods to produce a complex fuel spray pattern having a first fuel spray with a large spread angle and weak inertia force, i.e., a short penetration distance, and a second fuel spray that has a small spread angle with strong inertia force. The first fuel spray purportedly provides superior combustibility characteristics and reduced levels of unburned gaseous emissions. The second fuel spray pattern is purported to provide improved ignitability because the fuel with high inertia force collides vigorously with the piston cavity and is redirected towards the ignition plug.

Other methods for controlling the combustibility and/or ignitability of injected liquid fuel have been directed to control of the size of fuel droplets discharged from the fuel injector. For example, U.S. Pat. No. 5,626,115 granted May 6, 1997 to Akio Kawaguchi for a COMPRESSION-IGNITION TYPE ENGINE proposes controlling the fuel droplet size based on the theory that large fuel droplets injected during the intake stroke or early in the compression stroke of the combustion cycle will take longer to heat up than smaller fuel droplets. The mean particle size of the injected fuel is adjusted to a size in which the temperature of the fuel particles reaches the boiling point of the fuel at top dead center (TDC) of the compression stroke. In this manner, the fuel droplet vaporizes and is ignited and burned at approximately TDC.

Another approach to controlling fuel combustibility by regulation of fuel droplet size is disclosed in U.S. Pat. No. 6,006,720 granted Dec. 28, 1999 to Hiromichi Yanagihara, et al. for an INTERNAL COMBUSTION ENGINE proposes controlling the time-temperature history of a fuel droplet from a direct injection event by controlling the droplet size at the time of injection. This is accomplished by increasing the fuel droplet size, which in turn will slow the droplet heat-up relative to the bulk gas temperature during the compression stroke. The goal of this patent is to reduce the temperature rise rate of the fuel droplets during the compression stroke so that the fuel does not enter the "cool flame region" and prematurely initiate aldehyde formation.

However, none of the above methods of regulating the combustibility, ignitability, or volatility of injected fuels are directed to controlling the liquid-phase penetration depth of liquid fuel injected into the combustion chamber of an engine. Liquid fuel that remains on combustion chamber surfaces after the combustion event does not participate in the normal combustion process. It is generally wasted. Therefore, reduction or prevention of liquid fuel impingement improves fuel conversion efficiency. Furthermore, since liquid fuel remaining on combustion chamber surfaces does not undergo complete oxidation, these products can exit the combustion chamber as unburned hydrocarbons. Therefore, the prevention of liquid fuel impingement on combustion chamber surfaces will contribute to a reduction in output levels of regulated emissions. In addition, engine lubricant dilution can be reduced or prevented, since liquid fuel deposited on the combustion chamber surfaces can is able to mix with and dilute the engine lubricant, potentially degrading lubricant performance.

The present invention is specifically directed to overcoming the above-described problems associated with liquid fuel impingement onto combustion chamber surfaces. It is desirable to have a method, and an apparatus for carrying out the method, that provides control of the penetration distance of liquid-phase fuel from the fuel injector into the combustion chamber of direct injection engines. It is also desirable to have such a method and apparatus that enables the control of liquid-phase penetration distance that is able to compensate for real-time changes in fuel composition, injector geometry, injection pressure, combustion chamber thermodynamic conditions, or other engine operating parameters that lead to liquid fuel impingement on combustion chamber surfaces.

SUMMARY OF THE INVENTION

In accordance with one aspect of the present invention, a method for controlling the liquid-phase fuel penetration distance of fuel injected into the combustion chamber of an engine includes providing a source of liquid fuel for the engine, injecting the liquid fuel through at least one injector into the combustion chamber of the engine, and determining at least one operating parameter of the engine. A desirable liquid phase penetration distance is determined for the fuel injected into the combustion chamber of the engine based on the determined operating parameter of the engine. The liquid fuel is controllably heated prior to injection into the combustion chamber and the liquid-phase penetration distance of the fuel into the combustion chamber of the engine is altered to provide the determined desirable liquid phase penetration distance.

Other features of the method embodying the present invention include determining at least one operating parameter of the engine selected from the group consisting of fuel composition, fuel injector geometry, fuel injection pressure, combustion mode, and thermodynamic conditions existent in the combustion chamber of the engine.

In accordance with another aspect of the present invention, an apparatus to control the liquid-phase fuel penetration distance in an engine having at least one injector arranged to inject fuel into a combustion chamber of the engine includes a source of liquid fuel in fluid communication with the fuel injector and a programmable electronic controller adapted to generate a fuel temperature control signal correlative of at least one contemporary operating parameter of the engine. It also includes a means for controllably heating the liquid fuel prior to injection through the injector into the combustion chamber in response to the fuel temperature control signal.

BRIEF DESCRIPTION OF THE DRAWINGS

A more complete understanding of the method and apparatus for controlling the liquid-phase fuel penetration distance of fuel in an engine having direct fuel injection may be had by reference to the following detailed description when taken in conjunction with the accompanying drawings, wherein.

DETAILED DESCRIPTION OF THE INVENTION

In accordance with a preferred embodiment of the present invention, fuel temperature management is used to control the penetration distance of liquid-phase fuel, hereinafter also referred to as liquid length, from the fuel injector into the combustion chamber of direct injection (DI), compression-ignition, or auxiliary-energy-ignition (AEI) engines. AEI engines are engines which utilize an auxiliary source of energy for ignition, such as that delivered from a sparkplug, rail plug or micro-pilot injection.

The fuel spray from an injector can generally be broken down into liquid-phase and vapor-phase components. The present invention is directed to controlling the transition from liquid-phase to vapor-phase by controlling the fuel temperature prior to injection. The transition from liquid-phase to vapor-phase is influenced by several factors. It is known that liquid length generally decreases linearly with respect to increasing fuel temperature, due to an increased rate of fuel vaporization at higher fuel temperatures. Conversely, liquid length increases as fuel temperature is reduced. It is also known that the transition from liquid-phase to vapor-phase is influenced by other factors, such as fuel composition, injector geometry, injection pressure, combustion mode, and thermodynamic conditions existent in the combustion chamber of the engine. The present invention is directed to the use of fuel temperature management to control liquid length to compensate for real-time changes to fuel composition, injector geometry, injection pressure, combustion mode, combustion chamber thermodynamic conditions during engine operation, or other engine operating parameters that could otherwise lead to surface impingement of liquid fuel onto combustion chamber surfaces.

Figure 1:
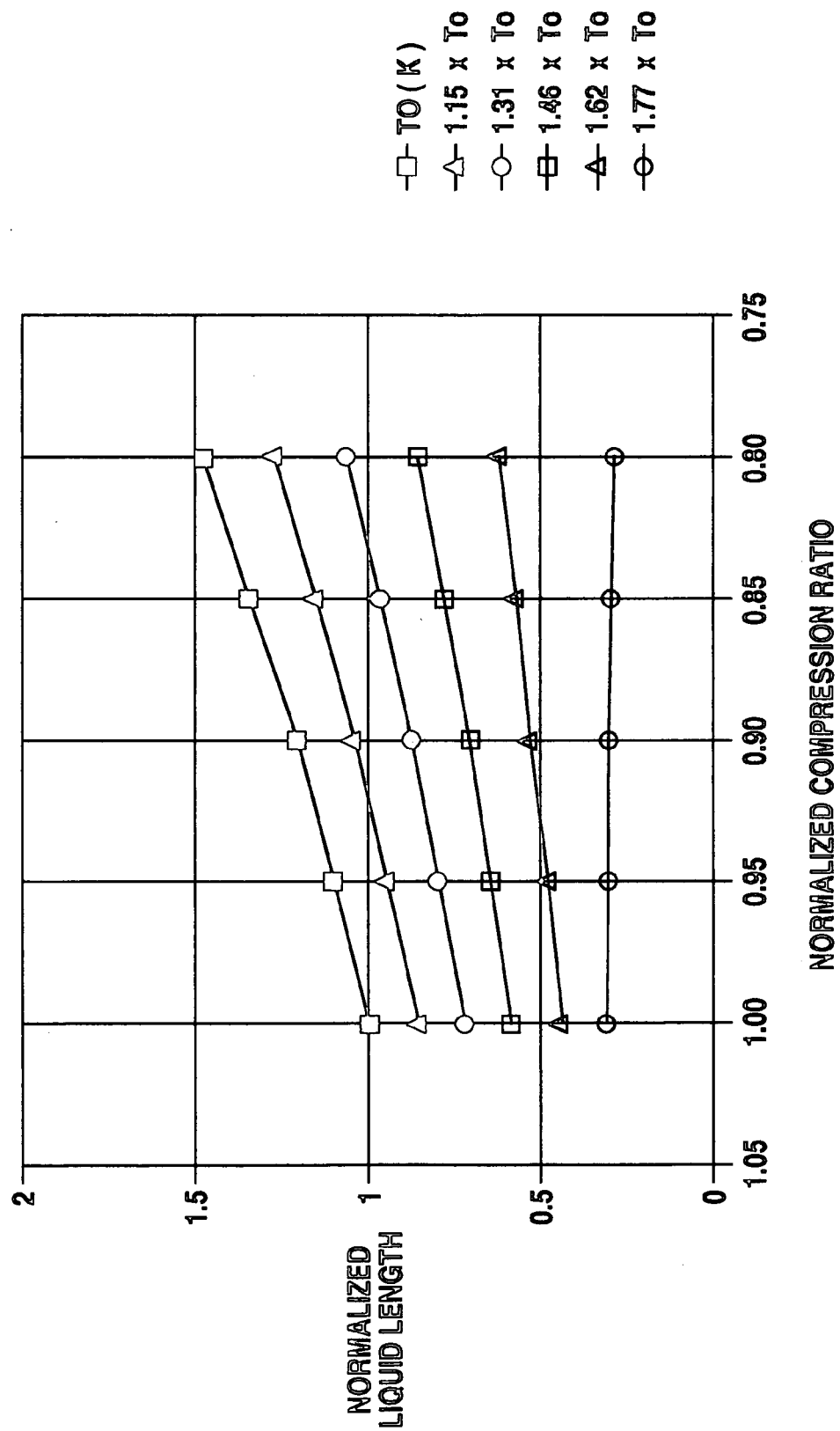
FIG. 1 is a graph showing the relationship between liquid length of a specific injected fuel with respect to compression ratio for several fuel temperatures.

By way of illustrative example, the relationship between compression ratio, fuel temperature and liquid length for a specific fuel is illustrated in FIG. 1. In this example, the fuel tested was DF2 Diesel fuel. The graph presents normalized liquid length versus normalized compression ratio for several fuel temperatures, $T_0$ (° K) to $1.77 \times T_0$. Liquid length is normalized to a compression ratio of 1.0 at fuel temperature $T_0$. As illustrated by the graph, reduced compression ratio generally results in increased liquid length at a given fuel temperature. However, as shown in the graph, it can be seen increased fuel temperature can moderate the effect of reductions in compression ratio and thereby control the transition of fuel from the liquid-phase to the vapor-phase.

Figure 2:
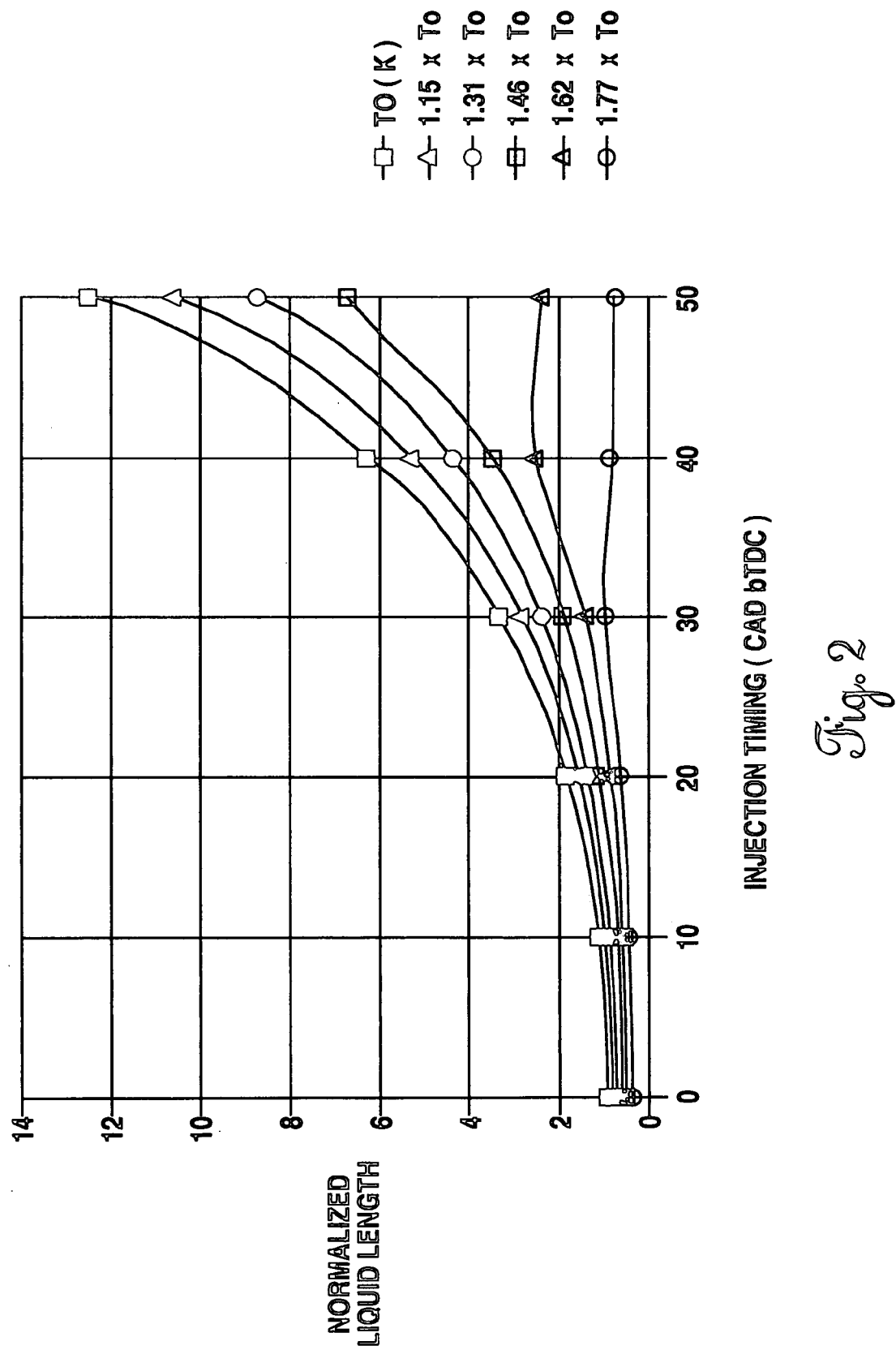
FIG. 2 is a graph showing the relationship between liquid length and injection timing of the specific injected fuel for the same several fuel temperatures.

By way of further example, FIG. 2 graphically represents the relationship between liquid length and injection timing for the several fuel temperatures ($T_0$ to $1.77 \times T_0$) and the same fuel represented in FIG. 1. The graph illustrates that as injection timing is advanced at a given fuel temperature, liquid length increases due to lower charge pressure and temperature at the time of injection. Furthermore, as fuel temperature is increased at a given injection timing, liquid length is reduced. Therefore, it can be seen that control of fuel temperature can compensate for real-time changes in injection timing.

As noted earlier, the liquid length of injected fuel can also be influenced by other changes in engine operating parameters, such as changes in fuel composition, injector geometry, injection pressure, combustion mode, or combustion chamber thermodynamic conditions. For each of these parameters, relevant data, similar to that illustrated in FIGS. 1 and 2 can be developed by laboratory or other test procedures. Thus, in accordance with the present invention, fuel temperature management to prevent liquid impingement on combustion chamber surfaces is applicable to spark-ignition, compression-ignition, AEI engines as well as hybrid direct injection Diesel/Homogenous Charge Compression Ignition (HCCI) engines in which HCCI operation is used for a portion of the speed-load region and Diesel operation is used for the remaining region. More specifically, ideal HCCI operation requires that all fuel be injected prior to combustion and that fuel-air mixing take place prior to combustion. The transition from Diesel to HCCI operation may be accomplished in a variety of ways including a reduction of compression ratio (geometric or effective, the latter by use of variable valve actuation or similar devices) and/or by considerably advancing the injection timing, both of which increase ignition delay, i.e., the time period between start of injection and the start of combustion. Both of these methods result in reduced pressure and temperature within the combustion chamber at the time of fuel injection, which is not compensated for results in a corresponding increase in liquid length and greater potential for surface impingement. However, as illustrated in FIGS. 1 and 2, increased fuel temperature may be used to compensate for lower combustion chamber pressure and temperature during injection and thereby minimize or prevent liquid impingement during HCCI operation.

Fuel temperature management in accordance with the present invention is also applicable to direct injected spark-ignition engines which can operate using a stratified-lean fuel-air mixture at light load and a homogenous fuel-air mixture at higher loads. One technique for stratified-lean operation is to inject the fuel late in the compression stroke to create a fuel-lean mixture throughout most of the combustion chamber, but provide a locally ignitable mixture near the sparkplug. However, it is generally undesirable to position a sparkplug in the direct path of liquid fuel spray due to the likelihood of sparkplug fouling. Thus, surface impingement is often used to allow fuel to interact with a hot surface to aid in vaporization before reaching the sparkplug.

In addition, surface impingement may used to redirect or the vaporized, or partially vaporized, spray towards the sparkplug.

The same engine may also create an homogenous mixture by injecting fuel earlier in the compression stroke or during the intake stroke. While liquid impingement may be useful during stratified-lean operation, it is generally unnecessary and therefore undesirable during homogenous operation. Therefore, in accordance with the present invention, temporarily increasing the fuel temperature during homogenous operation may be used to minimize or prevent liquid impingement without compromising stratified-lean mode operation.

Figure 3:
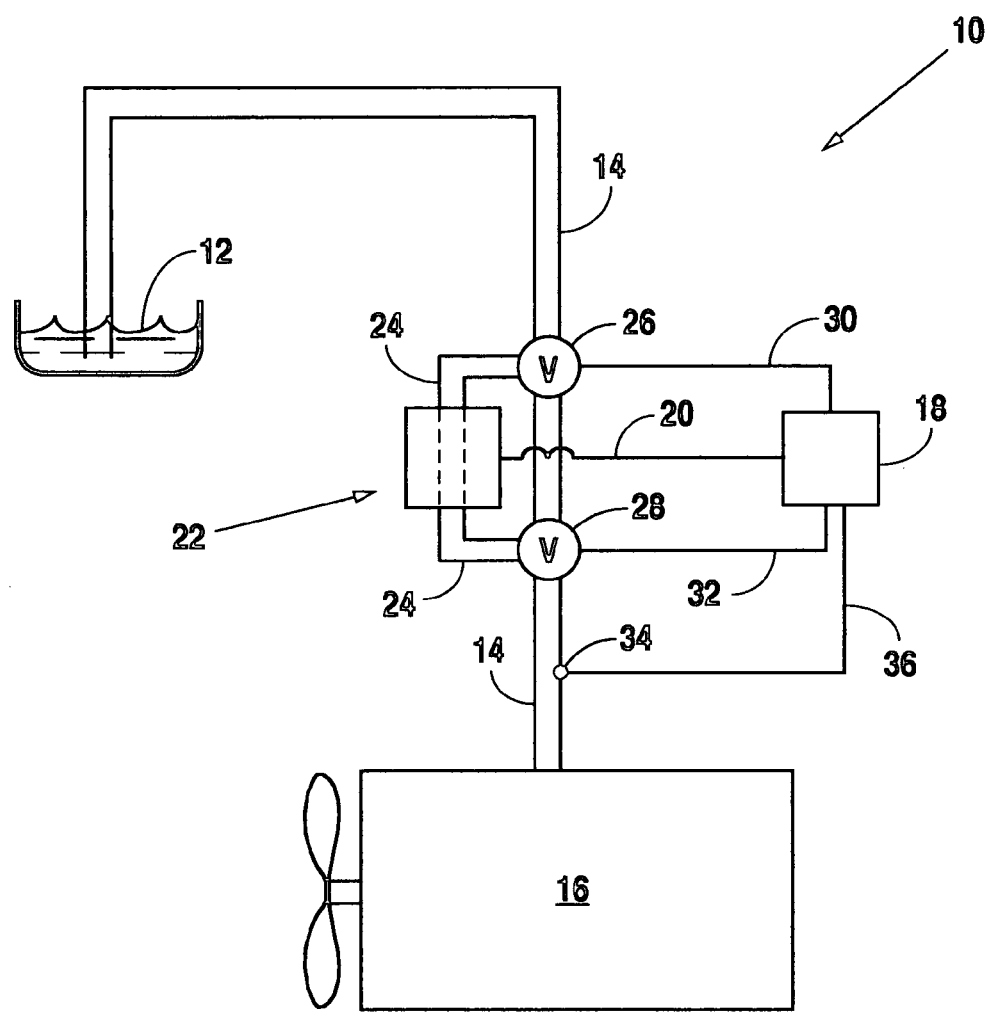
FIG. 3 is a schematic representation of an apparatus for controlling liquid-phase fuel penetration distance in a direct-fuel injection engine, in accordance with the present invention.

An apparatus for controlling liquid-phase fuel penetration distance in a direct-fuel injected engine is generally indicated by the reference numeral 10 in FIG. 3. The apparatus 10 includes a source of liquid fuel 12 that is in fluid communication, by way of a fuel conduit 14, with a direct fuel injected engine 16 having at least one combustion chamber. Typically, the fuel supply system includes additional components, such as fuel pumps, filters, injectors, fuel distribution rails, and fuel pressure regulators, all of which are not shown for the sake of clarity in presenting the specific fuel management apparatus 10 embodying the present invention. The fuel management apparatus 10 also includes a programmable electronic controller 18 that is adapted to generate a fuel temperature control signal 20 that is correlative of at least one contemporary operating parameter of the engine. The fuel temperature control signal 20 is directed to a means 22 for controllably heating the liquid fuel prior to injection into the combustion chamber of the engine 16. By way of example In the preferred embodiment, the means 22 for controllably heating the liquid fuel is an electrical resistance heater. However, in accordance with the present invention, fuel heating may be accomplished by other means, such as engine heat provided by exhaust gas or the engine cooling system, or conductively by placement of at least a portion of the fuel conduit in close proximity to a heated surface of the engine 16.

In the illustrative preferred embodiment of the present invention, the means 22 for controllably heating the liquid fuel prior to injection is disposed in thermo conductivity with a bypass conduit 24 through which the flow of liquid fuel is controlled by a modulatable first flow control valve 26 positioned between the source of fuel 12 and the means 22 for heating the liquid fuel in cooperation with a modulatable second flow control valve 28 disposed between the means 22 for heating the liquid fuel and the engine 16.

Operation of the first and second flow control valves 26, 28 is controlled by respective electrical control signals 30, 32, provided by the programmable electronic controller 18. In the illustrative preferred embodiment of the present invention, a temperature sensor 34 is disposed in the fuel conduit 14 at a position between the second flow control valve 28 and the direct-fuel injected engine 16 to provide a signal 36 to the programmable electronic controller 18 for closed-loop temperature control of the fuel injected into the engine 16.

The method for controlling the liquid-phase fuel penetration in a fuel-injected engine, in accordance with the present invention includes providing a source of liquid fuel 12 that is injected into the combustion chamber of the engine 16. At least one contemporary, i.e., currently existent, operating parameter of the engine is sensed, for example by conventional engine sensors, such as a fuel pressure sensor, an engine crankshaft position sensor, engine speed and/or load sensors, and exhaust gas and engine coolant temperature sensors. Other parameters, which may be delivered by defined input signals, include identification of a specific fuel composition, fuel injector geometry, or variable valve actuation system status.

A desirable liquid-phase penetration distance for fuel injected into the combustion chamber of the engine is determined based upon the previously determined one or more operating parameters of the engine or by assignment of a predetermined value based upon the determined contemporary operating parameters. The fuel is controllably heated prior to injection into the engine by passage of the fuel through the means 22 for controllably heating the liquid fuel, and the liquid-phase penetration distance is altered, as illustrated in FIGS. 1 and 2, in response to the determined desirable liquid-phase penetration distance.

In the preferred embodiment, the flow of controllably heated fuel to the engine is determined by the governed position of the modulatable flow control valves 26, 28 which control flow through the bypass portion 24 of the main fuel conduit 14. In an alternative embodiment, the means 22 for controllably heating the fuel prior to injection into the combustion chamber of the engine may be disposed directly in-line with the main fuel conduit 14, and activated when heating of the fuel is required. However, it is believed that the preferred embodiment using a bypass conduit 24 in which the heating means 22 is disposed in the bypass loop provides better modulation and temperature control of fuel supplied to the combustion chamber of the engine.

Moreover, with respect to determining one or more operating parameters of the engine, it is desirable on dual-fuel engines, i.e., engines which are designed to operate on more than one source of fuel, that the determined parameter include identification of the specific type of fuel being used. Also, as described above, an indication of current combustion mode, which may be varied during operation of hybrid direct injected Diesel/HCCl engines or direct injection spark-ignition engines that operate with stratified-lean fuel-air mixtures at light load and homogenous fuel-air mixture at higher loads, may also provide a contemporary operating parameter signal upon which fuel temperature can be modulated and, accordingly liquid-phase length controlled, for each particular combustion mode.

Combustion chamber thermodynamic conditions are markedly different at cold start than they are after a period of warmup and normal operation. The combustion chamber thermodynamic conditions that may dictate alteration of the liquid-phase length of injected fuel could may be determined by a variety of measured parameters, such as engine coolant temperature, the temperature of a thermally conductive portion of the engine adjacent the combustion chamber, or exhaust gas temperature.

INDUSTRIAL APPLICABILITY

The present invention is particularly useful for preventing liquid fuel impingement on combustion chamber surfaces during normal engine operation. The reduction or prevention of liquid fuel impingement improves the fuel conversion efficiency, i.e., the ratio of the work produced from the injected fuel mass to the energy content of the injected fuel mass, since liquid fuel that remains on the combustion chamber surface does not participate in the normal combustion process and is generally wasted. Moreover, the present invention provides a method and apparatus for controlling the liquid-phase length of injected fuel to prevent or reduce liquid fuel impingement and thereby prevent or reduce the amount of liquid fuel remaining on combustion chamber surfaces that does not undergo complete oxidation and accordingly exits the combustion chamber as unburned hydrocarbons.

Another important advantage of the use of fuel temperature management to control the penetration distance of liquid-phase fuel injected into the combustion chamber of direct injection engines, in accordance with the present invention, is that engine lubricant dilution is reduced or prevented altogether. Liquid fuel deposited on combustion chamber surfaces has the potential of mixing with and diluting the engine lubricant, resulting in degraded lubricant performance.

The present invention is particularly applicable to hybrid direct-injected Diesel/HCCI engines, in which HCCI operation is used for a portion of the speed-load region and Diesel operation is used for the remaining region, each operating mode being accomplished in a variety of ways which may include reduction of compression ratio or injection timing. Fuel temperature management in accordance with the present invention can compensate for the real-time changes in combustion chamber pressure and temperature during injection and minimize or prevent liquid impingement during HCCI operation. Moreover, the fuel management apparatus and method embodying the present invention is also applicable to direct-injected spark-ignition engines which operate using a stratified-lean fuel-air mixture at light load and homogenous fuel-air mixture at higher loads.

Although the present invention is described in terms of preferred illustrative embodiments, those skilled in the art will recognize that actual fuel temperature management system arrangements and control devices will be dependent upon the configuration and operating characteristics of a specific engine. Such systems and applications of the method embodying the present invention are intended to fall within the scope of the following claims. Other aspects, features, and advantages of the present invention may be obtained from a study of this disclosure and the drawings, along with the appended claims.

What is claimed is:

1. A method for controlling the liquid-phase fuel penetration distance of fuel in an engine adapted to operate in a plurality of combustion modes and having direct fuel injection into a combustion chamber of the engine, said combustion chamber having predefined interior surfaces and said method comprising:

providing a source of liquid fuel for said engine;

injecting fuel from said source of liquid fuel through at least one injector into the combustion chamber of the engine;

determining at least one contemporary operating parameter of the engine;

determining a desirable combustion mode based on the determined contemporary operating parameter of the engine;

determining a desirable liquid phase penetration distance for fuel injected into the combustion chamber of said engine at which fuel impingement on said predefined interior surfaces of the combustion chamber is minimized, said desirable liquid phase penetration distance being based on said determined desirable combustion mode and said at least one contemporary operating parameter of the engine;

controllably heating fuel provided by said source of liquid fuel prior to injection into the combustion chamber of said engine and altering the liquid-phase penetration distance of said fuel into the combustion chamber of said engine in response to the determined desirable liquid phase penetration distance for liquid fuel injected into the combustion chamber of said engine.

2. The method, as set forth in claim 1, wherein said determining at least one operating parameter of the engine includes determining at least one contemporary operating parameter of the engine selected from the group consisting of fuel composition, fuel injector geometry, fuel injection pressure, engine speed, engine load, and thermodynamic conditions existent in the combustion chamber of said engine.

3. An apparatus for controlling liquid-phase fuel penetration distance in an engine adapted to operate in a plurality of combustion modes and having direct fuel injection into a combustion chamber having predefined interior surfaces, said apparatus comprising:

a source of liquid fuel in fluid communication with the combustion chamber of said engine;

a programmable electronic controller adapted to generate a fuel temperature control signal correlative of a desired combustion mode based on at least one contemporary operating parameter of said engine; and, a means for controllably heating said liquid fuel prior to injection into the combustion chamber of said engine to a temperature at which fuel impingement on said predefined interior surfaces of the combustion chamber is minimized in response to said fuel temperature control signal, said means being disposed between said source of liquid fuel and said combustion chamber of the engine and in thermal communication with said liquid fuel prior to injection into the combustion chamber of the engine.

4. The apparatus, as set forth in claim 3, wherein the fuel temperature control signal correlative of at least one contemporary operating parameter of said engine is correlative of at least one contemporary operating parameter of the engine selected from the group consisting of fuel composition, fuel injector geometry, fuel injection pressure, engine speed, engine load, and thermodynamic conditions existent in the combustion chamber of said engine.

5. The apparatus, as set forth in claim 3, wherein said means for controllably heating said liquid fuel prior to injection into the combustion chamber of said engine includes an electrical resistance heater in thermal communication with said liquid fuel.

6. The apparatus, as set forth in claim 3, wherein said apparatus includes a temperature sensor in electrical communication with said programmable electronic controller and adapted to measure the temperature of heated liquid fuel prior to injection into the combustion chamber of said engine.

* * * * *

UNITED STATES PATENT AND TRADEMARK OFFICE
CERTIFICATE OF CORRECTION

PATENT NO.        : 7,017,547 B2
APPLICATION NO. : 10/760645
DATED             : March 28, 2006
INVENTOR(S)       : Darius Mehta et al.

Page 1 of 1

It is certified that error appears in the above-identified patent and that said Letters Patent is hereby corrected as shown below:

On the cover page, item (73) Assignee: should read -- Southwest Research Institute, San Antonio, TX (US) --

Signed and Sealed this

Ninth Day of January, 2007

JON W. DUDAS
*Director of the United States Patent and Trademark Office*